UNITED STATES PATENT OFFICE.

CAMPBELL MORFIT, OF BALTIMORE, MARYLAND.

IMPROVEMENT IN COMPOUNDS FOR DESSERT FOOD.

Specification forming part of Letters Patent No. 183,862, dated October 31, 1876; application filed May 10, 1876.

*To all whom it may concern:*

Be it known that I, CAMPBELL MORFIT, technological chemist, of Baltimore, Maryland, United States America, but now in London, England, have invented a certain Compound to be used in the Preparation of a Dessert Food; and I do hereby declare the following to be a full and correct description of the same.

The nature of my invention consists in a composition formed by mixing animal gelatine with the condensed milk of cow, sugar, and borax, so as to produce a portable and concentrated food compound.

To prepare this compound, take solid dry gelatine of refined quality, dissolve it in sufficient hot water, sweeten it with sugar, and when the liquor is perfectly fluid, mix it with about four times its weight of the condensed milk of cow as sold in commerce. The milk must be warmed previously and incorporated thoroughly with one to two drams of powdered borax for every pound of milk employed, as these precautions are indispensable for imparting to the product a capacity for being remelted and redissolved any number of times without losing its homogeneousness or becoming tough.

The condensed milk of commerce usually contains added sugar to the extent of thirty per cent., more or less; but there is some made without other sugar than its natural lactose. This latter kind of condensed milk is as suitable for the purpose of my invention as the former; but when it is used the proportion required will be less, only the quantity of free sugar will have to be increased by making the sweetening of the gelatine liquor in the first instance more decided.

If my invention should be carried out in a manufactory of gelatine, then instead of dry gelatine, take the finished gelatine liquor just at the stage when it is to be poured out to cool, set, and dry. Experience will have established a nearly uniform strength for such liquor, so that it will be known what volume of it represents the weight of dry gelatine required.

In all cases the mixture must be accomplished thoroughly by active stirring, and when the ingredients, as noted already, have been put together the hot fluid is to be flavored with coffee, chocolate, vanilla, essence of lemon, orange-flower water, or other suitable material, as may be preferred, and then poured upon a marble cooling-slab. The thin sheets thus formed are to be cut into lozenges, shreds, or threads, and enveloped in neat packages for market.

The lozenges, shreds, or threads are the dry, ready, portable condensed stock for making "blanc-mange" upon short notice, and without other addition than water. It is only necessary to take about two ounces of the dry stock, dissolve it perfectly by gentle heat in about ten fluidounces of water, pour the solution into a mold, and leave it to set. When cool and firm, as it will be in one or more hours, according to the temperature of the atmosphere, it is a form of richer and more delicious blanc-mange than can be made with fresh milk, and at a comparatively trifling cost of money, labor, and time.

What I claim is—

The composition, consisting of animal gelatine, cow's milk, and borax, substantially in the manner and for the purposes hereinbefore set forth.

The above specification of my said invention signed and witnessed at London this 15th day of April, A. D. 1876.

CAMPBELL MORFIT.

Witnesses:
    M. D. M. CARPENTER,
    MARIE C. C. MORFIT.